Sept. 30, 1958     A. W. CHANDLER     2,853,881
COMBINED HYDROMETER AND THERMOMETER Filed June 10, 1955

INVENTOR
ALANSON W. CHANDLER,

BY

ATTORNEY

United States Patent Office 2,853,881
Patented Sept. 30, 1958

2,853,881
COMBINED HYDROMETER AND THERMOMETER

Alanson W. Chandler, Tulsa, Okla.

Application June 10, 1955, Serial No. 514,473

2 Claims. (Cl. 73—449)

The present invention relates primarily to an instrument for determining the specific gravity of liquids and further relates to a thermometer mounted within the hydrometer casing so that the temperature of the liquid which is undergoing observation may be determined whereby the hydrometer readings may be corrected with regard to departures from a standard temperature.

Instruments for determining the specific gravity of liquids are well-known. Such a conventional device includes a glass casing which has a definite volume in relation to its weight and is provided with a scale on the upper portion thereof so that the specific gravity of the liquid is indicated by the depth to which the instrument sinks in the liquid under observation. In determining the density of many liquids such as petroleum products there is a relatively high temperature expansion coefficient which makes it necessary to refer the specific gravity readings obtained from the hydrometer to a standard temperature and to correct the hydrometer reading by any temperature difference between the standard temperature and that of the liquid under observation. It is accordingly an object of the present invention to provide a thermometer in association with the hydrometer so that the bulb portion of the thermometer is arranged in the lower tip portion of the hydrometer and thus is in a position to be effected by the liquid which serves to influence the position of the hydrometer.

In connection with some petroleum liquids such as the propanes and butanes which have high vapor pressures it is necessary to carry out a test for the density thereof under pressure. Such liquids are often stored and transported within containers and in obtaining the specific gravity of such liquids the test is made by arranging the hydrometer within the container. Under such circumstances, the hydrometer is exposed to the pressure within the container so that there is a possibility of the pressure acting on the bulb of the thermometer to force the liquid upwardly in the tube thereof and to provide a false temperature indication resulting from the pressure applied to the bulb portion of the thermometer.

It is a further object of the present invention to mount the bulb of the thermometer within the hydrometer casing in such a manner that heat will be conducted from a liquid under test to the bulb of the thermometer while the casing of the hydrometer and the conductive material serve to prevent pressure under which the liquid is subjected from acting on the bulb portion of the thermometer and thereby avoiding a false temperature indication.

A more specific object of the invention is to embed the thermometer bulb in a plurality or mass of metallic particles having a good heat conducting characteristics and of such size as to provide sufficient air space within the mass of pellets to permit some expansion of the metal particles without materially enlarging the volume of the mass during the heating thereof to insure heat conductivity to the thermometer bulb without the application of physical force to the exterior of the thermometer bulb.

Other objects and features of the invention will be appreciated and become apparent to those skilled in the art as the present disclosure proceeds and upon consideration of the accompanying drawing and the following detailed description wherein an exemplary embodiment of the invention is disclosed.

Figure 1:
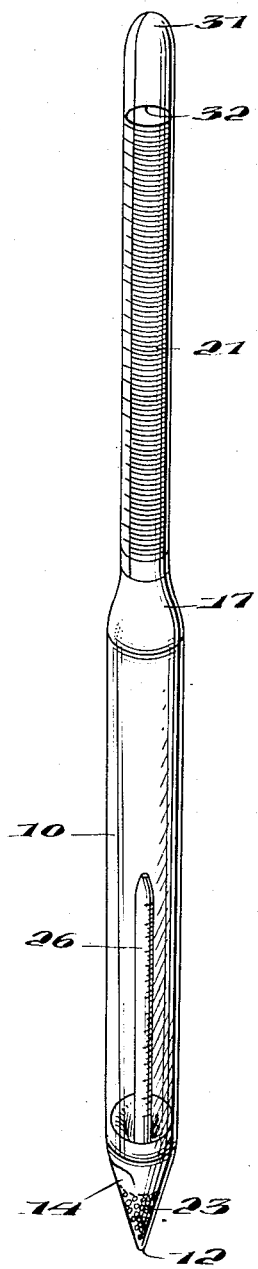
Fig. 1 is a perspective view of a combined hydrometer and thermometer exhibiting the invention.
Figure 2:
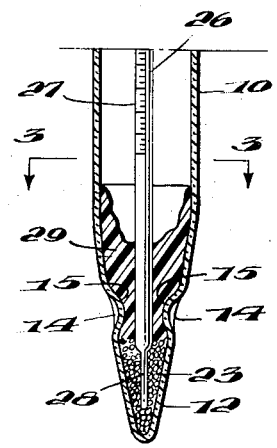
Fig. 2 is a fragmentary sectional view of the lower end portion of the device.
Figure 4:
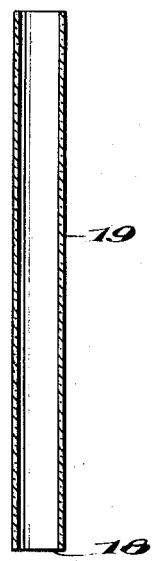
Fig. 4 is a sectional view of a glass tube which forms an upper portion of the hydrometer casing.
Figure 3:
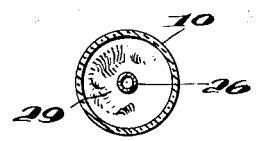
Fig. 3 is a transverse sectional view taken on the line 3—3 of Fig. 2.
Figure 5:
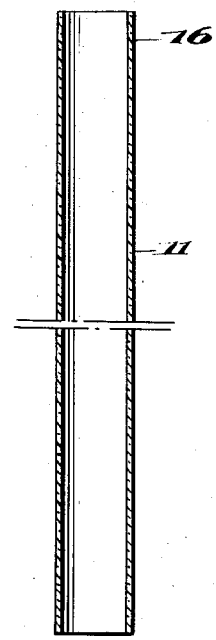
Fig. 5 is a sectional view of a glass tube which forms the lower portion of the hydrometer casing.

A hydrometer and thermometer assembly exhibiting the invention includes a lower portion 10 of a hydrometer casing which may be formed of a glass tube such as shown at 11 in Fig. 5. The lower end of the tube 11 is closed in a conventional manner to provide a conical shaped tip portion 12 which is sealed to provide an impervious lower end for the hydrometer casing. During the closing the lower end of the tube 11 of Fig. 5 indentations 14 are provided in the glass wall as shown in Fig. 2. These indentations provide for upsetting of the glass inwardly to provide convex projections 15 within the lower end portion of the hydrometer casing.

The upper end 16 of the tube 11 is by conventional methods deformed inwardly to provide a neck portion 17 and the smaller end thereof is fused to the lower end 18 of a smaller glass tube 19 which serves as the upper portion 21 of the hydrometer casing. The juncture between the smaller and larger tubes is sealed and provides an impervious joint between the upper portion 21 and the lower portion 10 of the hydrometer casing. The upper end of the tube 19 which forms the upper portion 21 of the hydrometer casing remains open until the thermometer is mounted therein and may remain open until calibration of the instrument is completed.

The conical shaped tip 12 of the casing is partially filled with a material having heat conducting properties. Such material may comprise particles 23 formed from a material having good thermal conductivity characteristics. In one embodiment aluminum or copper shot have been found to provide satisfactory particles. The metal particles may be of different sizes or each shot may have the same diameter. In order to reduce the volume of air space between each pellet the size of the metal particles 23 or shot are of approximately one millimeter diameter although smaller sizes may be used. The shot size in the range of one millimeter diameter provides air space permitting slight expansion of the individual particles during heating without materially increasing the total volume of the mass of shot and at the same time provides good heat conductivity in the range of temperatures to which the hydrometer is normally subjected.

A thermometer 26 of a conventional type having a scale 27 on the stem thereof and a bulb 28 at the lower end is mounted within a lower portion of the hydrometer casing. The bulb 28 contains mercury or the like which upon expansion moves upwardly in the stem of the thermometer in a conventional manner. The thermometer is mounted in the lower portion 10 of the thermometer casing so that the bulb 28 thereof is embedded in the metal particles 23. These pellets are readily displaced during the insertion of the thermometer bulb and as a result of the generally spherical shape move into physical engagement with the bulb 28 of the thermometer and lie in engagement with the exterior thereof. The metallic particles 23 serve the purpose of weighting the instrument and function to transfer heat from the exterior of the hydrometer casing to the presence of the thermometer bulb 28 without the transmission of any inward forces resulting from the application of pressure to the exterior of the lower portion of the hydrometer casing.

It will be observed that the metallic particles fill the inverted conical tip portion 12 of the hydrometer casing below the convex projections 15. A quantity of a thermo-plastic compound in a granular form is then supplied into the lower portion 10 of the hydrometer casing around the lower end of the thermometer 26 and over the particles 23. Any suitable thermoplastic resin or wax may be employed for this purpose. The tip portion of the hydrometer casing with the thermometer bulb buried in the particles 23 is then immersed in Dry Ice while heat is applied to the granular material which becomes plastic or molten and flows or arranges itself over the particles and around the perimeter of the lower end of the thermometer. The Dry Ice prevents the heat from unduly expanding the liquid within the thermometer and the sealing material desirably has a low melting point. The plastic material is then permitted to cool and occupies a position somewhat as indicated at 29 in Fig. 2. Any other suitable type of plasticizable material may be used to form the stopper or plug 29. The hardened material serves to hold the thermometer stem 26 in an erect position along the axis of the lower portion 10 of the hydrometer casing. The plug adheres to the interior of the casing and to the periphery of the stem 26. The plug is also physically anchored by the projections 15 and prevents the particles from being dislodged from a position within the tip portion of the hydrometer. It will be observed that the hardened compound or plug 29 extends along a material axial portion of the thermometer so as to effectively hold it in the erect position without the possibility of movement of the thermometer relative to the hydrometer casing and serves to effectively maintain the bulb 28 in a buried condition in the heat conducting particles 23.

The upper end of the tube 19 which forms an upper portion 21 of the hydrometer casing may be closed to provide a sealed end portion 31 and a scale may be applied to the upper portion 21 of the hydrometer housing such as by etching the exterior or interior of the upper portion 21 of the hydrometer casing. The calibration of the hydrometer and the scale markings therefor may be carried out in a conventional manner. It is also possible to provide a scale on paper or parchment which is then rolled in tubular form and inserted through the open upper end of the tube 19 before it is closed. A paper tube carrying the scale markings thereon is shown at 32 and is secured in position by an adhesive or the like to the inner surface of the tubular upper end portion 21 of the casing.

In use the lower end of the hydrometer casing is inserted in the liquid the density of which is to be determined. The weighted lower end of the device as provided by the mass of metallic particles 23 and the hydrometer bulb 28 embedded therein sinks in the liquid and the instrument is maintained in an erect condition as a result of the mass concentrated at the lower end of the device. When the liquid under observation is under pressure any inward distortion of the conical lower end portion of the hydrometer casing is not transmitted to the bulb 28 of the thermometer because of the spaces provided between the individual metallic particles 23. The metallic particles 23 serve to conduct heat to the thermometer bulb 28 so that the temperature reading thereof on the scale 27 represents the actual temperature of the liquid.

While the invention has been described with reference to specific structural features and with regard to various materials it will be appreciated that changes may be made in the structural elements as well as the general organization. Such changes and others may be made without departing from the spirit and scope of the invention as set forth in the appended claims.

What I claim and desire to secure by Letters Patent is:

1. An instrument for determining the specific gravity and temperature of a liquid under pressure comprising in combination, a casing having a closed lower end, a specific gravity scale carried by an upper portion of said casing, loose particles having good heat conducting characteristics filling a lowermost portion of the lower end of said casing, a thermometer located entirely within said casing having a bulb embedded in said particles with all portions of the bulb spaced from said casing, means within the casing retaining said particles in loose assembled relationship in contact with the interior of the casing and the exterior of said bulb whereby the pressure to which the liquid is subjected and surrounding the lower end of said casing and upon inward deflection of the casing causes said particles to be rearranged without transferring force to the exterior of the thermometer bulb whereby the thermometer provides an accurate indication of the temperature of the liquid.

2. An instrument according to claim 1, wherein the particles consist of spherical metal pellets each having a diameter not greater than one millimeter.

References Cited in the file of this patent

UNITED STATES PATENTS

| | | |
|---|---|---|
| 1,907,103 | Harris | May 2, 1933 |
| 2,180,995 | Nurnberg | Nov. 21, 1939 |
| 2,520,911 | Chaney | Sept. 5, 1950 |
| 2,667,073 | Wappner | Jan. 26, 1954 |